(12) United States Patent
Entman et al.

(10) Patent No.: US 6,292,551 B1
(45) Date of Patent: Sep. 18, 2001

(54) CALL REESTABLISHMENT SYSTEM

(75) Inventors: Mark E. Entman, Golden, CO (US); Timothy M. Wilson, Somerville, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/018,293

(22) Filed: Feb. 4, 1998

(51) Int. Cl.[7] ............................................. H04M 7/00
(52) U.S. Cl. ..................... 379/221; 379/201; 379/210; 379/219; 379/220; 455/434; 455/455
(58) Field of Search ................................. 379/201, 210, 379/211, 212, 229, 230, 221, 279, 291, 292, 293; 455/434, 455

(56) References Cited

U.S. PATENT DOCUMENTS

| | | | |
|---|---|---|---|
| 5,345,503 | * 9/1994 | Lee .......................................... | 379/221 |
| 5,544,224 | * 8/1996 | Jonsson et al. ........................ | 455/434 |
| 5,548,639 | * 8/1996 | Ogura et al. ........................... | 379/221 |
| 5,646,936 | * 7/1997 | Shah et al. ............................. | 370/228 |
| 5,812,656 | * 9/1998 | Garland et al. ........................ | 379/208 |
| 5,991,263 | * 11/1999 | Bales et al. ............................ | 370/225 |
| 6,119,003 | * 9/2000 | Kukkohovi ............................. | 455/435 |

* cited by examiner

Primary Examiner—Ahmad Matar
Assistant Examiner—Bing Bui
(74) Attorney, Agent, or Firm—Duft, Graziano & Forest, P.C.

(57) ABSTRACT

The call reestablishment system functions to provide the user with the ability to replace an existing communication connection with another equivalent communication connection in an automated manner that does not disrupt the existing call and to also provide the user with the ability to create a replacement communication connection using a different common carrier as the billing source. The call reestablishment system is activated when a party on an existing communication connection generates feature activation control signals indicative of the desire to access the call reestablishment system. The serving communication system, in response to receipt of the feature activation control signals, enables the requesting party to input data indicative of the nature of the call reestablishment that is required. The call reestablishment system is responsive to this data for creating a replacement communication connection for the existing communication connection and, once the facilities are in place to enable the calling and called parties to communicate, the call reestablishment system automatically transfers the calling and called parties from the original communication connection to this newly established communication connection in a manner that is transparent to the parties and without loss of any communications.

30 Claims, 3 Drawing Sheets

CALL REESTABLISHMENT SYSTEM

Field of the Invention

This invention relates to communication systems and, in particular, to a communication system that enables a user to automatically establish a replacement call connection for an existing call connection without disrupting the communication between the caller and the called party.

PROBLEM

It is a problem in the field of communication systems to provide the user with high quality communication connections at a reasonable cost and yet also provide the user with a certain degree of control over the communication connections to satisfy their particular communication needs. A particular example of this problem is the instance where a user establishes a communication connection with a called party and discovers that the quality of the communication connection is inadequate for the needs of the parties. In this instance, in existing systems, there are three options that are available to the calling party: hang up the existing communication connection and establish a new communication connection to replace the original communication connection, hang up the communication connection and request an operator to establish a new communication connection to replace the original communication connection, or remain on the communication connection and endure the lack of quality of the communications.

In the first of these options, the calling party incurs the cost and inconvenience involved in requesting the called party to remain available while the calling party drops the communication connection and dials a new communication connection to the called party to replace the original communication connection. A secondary cost with this procedure is that the initial charges for the establishment of a communication connection are significantly greater than the cost to remain on an existing communication connection for an equivalent amount of time. This is especially true in the instance where the call is originated from a hotel or in many cases in a foreign country.

The second of the above noted options suffer the same penalties as the first option with the exception that the user is typically credited with the cost of the original communication connection since that communication connection did not provide the requested quality of service. Additional time is required, however, to contact the operator and explain the situation and have the operator establish a new communication connection to the called party.

The final of the options is the least expensive in terms of out-of-pocket costs charged to the calling party, but the two parties to the communication connection must endure the aggravation of poor quality communications and, in the case of a data communication connection, the potential loss of data due to the inadequate quality of the communication connection.

Thus, there are no communication systems that enable the automated transfer of an existing communication connection between the calling and called parties to another communication connection of equivalent nature. All communication connection substitutions require the manual intervention of the calling party and result in the interruption of the communication between the calling and called parties while a replacement communication connection is manually established.

Another example of the above noted problem not discussed above is the instance where a party originates a call in a foreign country to a domestic destination and must pay the tariffs of the communication carrier that serves the territory from which the call is originated. The tariffs charged by a foreign carrier can be greatly in excess of those charged by a domestic carrier. Therefore, it is greatly advantageous, especially on calls of long duration, to have the communication connection originated from the domestic destination to the calling party rather than from the calling party to the domestic destination. Unfortunately, all existing systems that are capable of such a transfer of billing represent systems that are callback systems that respond to the origination of a call by the calling party to the automated callback system with the calling party identifying their telephone number by disconnecting from the communication connection and originating a new call to the calling party to thereby obtain the advantageous tariffs charged by the domestic carrier. The problem with these systems is that the calling party must originate a call to the automated system which then calls the calling party back on a new communication connection and thereby preventing the calling party from calling the desired destination directly since the automated calling system must perform the callback function and then enable the calling party to transfer the call to an alternate destination once the replacement communication connection has been established. Furthermore, if the calling party is calling from a hotel, the automated callback system has no capability to designate the particular hotel room in which the calling party has originated the call from. Therefore, no automated callback systems can provide the communication capability to enable a calling party to automatically obtain benefit of the advantageous domestic tariffs when directly calling a destination without having a significant complex set of steps that must be executed to obtain benefit of the domestic tariff, which steps offset the economic benefit of the reduced tariff especially in the case where numerous calls must be made by the calling party.

Therefore, it is a problem in communication systems that the calling party has little if any choice in the selection of facilities that are used to serve a particular communication connection, either in quality of the communication connection or the serving carrier with their particular tariff rates. If the calling party is dissatisfied with the communication connection, the calling party must terminate the communication with the called party and then manually initiate a replacement communication connection.

A number of prior art systems have been developed to address the automatic selection of communication facilities to serve a particular communication connection, but these prior art systems are exclusively directed to the determination that the called party has the capability for enhanced communication capability, such as the provision of video communication service in addition to audio communication, and serve to acquire the necessary additional facilities to serve the original communication connection. Examples of such systems can be found in a number of patents, including published Japanese Patent Application Serial Number 205953 that discloses a video telephone set call control method that uses the basic interface of ISDN to provide the facilities necessary to serve a video communication connection where the original communication connection has no indication that the called party has such capability. In particular, the disclosed apparatus originates a call over one of the communication channels provided by ISDN to the called station set and, once connected thereto, queries the destination station set to determine the nature of its communication capabilities. If it is determined that the destination station set has video communication capability, the apparatus automatically requests connection of another communication channel that can serve the video communication needs of the calling and destination station sets. If the destination station set does not have video communication capability, the system simply uses the original communication channel of the ISDN connection to serve this call.

A similar video telephone station set communication system is disclosed in U.S. Pat. No. 5,184,345 titled "Enhanced ISDN 800 Service" and that discloses a system that automatically provides a second communication path between a customer and a business in order to provide additional product information, such as video information to the customer. This system responds to the receipt of an incoming call on a B channel of an ISDN facility by determining both the calling party's network address and whether the calling party is equipped with facilities that can receive video information. If so, an additional B channel connection is established between the calling party and the enhanced ISDN 800 service system to thereby enable the transmission of video information to the calling party.

U.S. Pat. No. 5,371,534, titled "ISDN-Based System For Making A Video Call" discloses apparatus that converts an existing audio grade ISDN voice connection between a calling party and a called party to a video and audio communication connection. This is accomplished by the system, in response to the establishment of a voice call on one of the B channels of an ISDN connection, determining that the calling and called station sets are capable of video and audio communications, then selecting another B channel of the same ISDN communication connection that is used for the provision of combined audio and video communications. The system then automatically transitions the existing voice call from the original B channel to the voice and video communication channel of the second B channel.

The difficulty with all of these video communication systems is that they require the use of an ISDN channel, which is generally unavailable to the average subscriber, and then only upgrade the voice communication connection to a voice and video communication connection without the calling party having control over such activity. These systems therefore simply automatically determine the nature of the station sets used by the calling and called parties and automatically provide additional communication capability that corresponds to the capabilities of the station set apparatus. These automated systems do nothing to address the problems that were noted above with regard to the provision of a communication connection that is of inadequate quality to the user or of a higher tariff rate than desired by the user.

Therefore, there are no known communication systems that provide the user with the ability to designate the automatic replacement of an existing communication connection with another communication connection. Existing automated systems are solely directed to the provision of video communication capabilities to an existing voice communication connection and do not provide the user with any control over the facilities selected to implement the communication connection.

SOLUTION

The above described problems are solved and a technical advance achieved in the communication field by the present call reestablishment system that functions to provide the user with the ability to replace an existing communication connection with another equivalent communication connection in an automated manner that does not disrupt the existing call and to also provide the user with the ability to create a replacement communication connection using a different common carrier as the billing source. The call reestablishment system is activated when a party on an existing communication connection generates feature activation control signals indicative of the desire to access the call reestablishment system. The serving communication system, in response to receipt of the feature activation control signals, enables the requesting party to input data indicative of the nature of the call reestablishment that is required. The call reestablishment system is responsive to this data for creating a replacement communication connection for the existing communication connection and, once the facilities are in place to enable the calling and called parties to communicate, the call reestablishment system automatically transfers the calling and called parties from the original communication connection to this newly established communication connection in a manner that is transparent to the parties and without loss of any communications.

The call reestablishment system is applicable to many communication environments and can be part of switching apparatus that serves a plurality of customers in a commercial environment, such as a customer premise switching system, or can be part of the public switched telephone network (PSTN) or can be part of the facilities of an intranet that consists of privately owned facilities that serve a number of communication locations. In any of these applications, the function of the present call reestablishment system is to define the type of communication connection that is requested by the calling party, locate facilities to create such a communication connection, establish the communication connection without connecting the calling and called parties to the communication connection, and thence transfer the calling and called parties from their original communication connection to this newly established communication connection in a manner to avoid disrupting the existing communications between the called and calling parties. The particulars of how the present call reestablishment system interacts with the serving switching equipment are dependent on the particular communication environment and the degree of integration of the present call reestablishment system and the serving switching equipment. Furthermore, the switching equipment serving both the calling and called parties must be responsive to the communications received from the call reestablishment system to facilitate the transfer of the calling and called parties from the existing communication connection to the newly established communication connection.

In one example of an embodiment of the present call reestablishment system, the calling and called parties are both served by switching equipment that is part of an intranet wherein the switching equipment that serves the calling party is connected to the switching equipment that serves the called party by a plurality of trunk facilities. These trunk facilities need not be ISDN facilities but can be common voice grade communication trunks or, alternatively, they can be a time multiplexed communication channel such as a T1 carrier, or they can be ISDN trunk facilities. In all of these cases, the particulars of how the call reestablishment system effects the origination of a new communication connection and the substitution of this communication connection for the original communication connection vary as a function of the specific technological requirements of the communication facilities.

DETAILED DESCRIPTION

Figure 1:
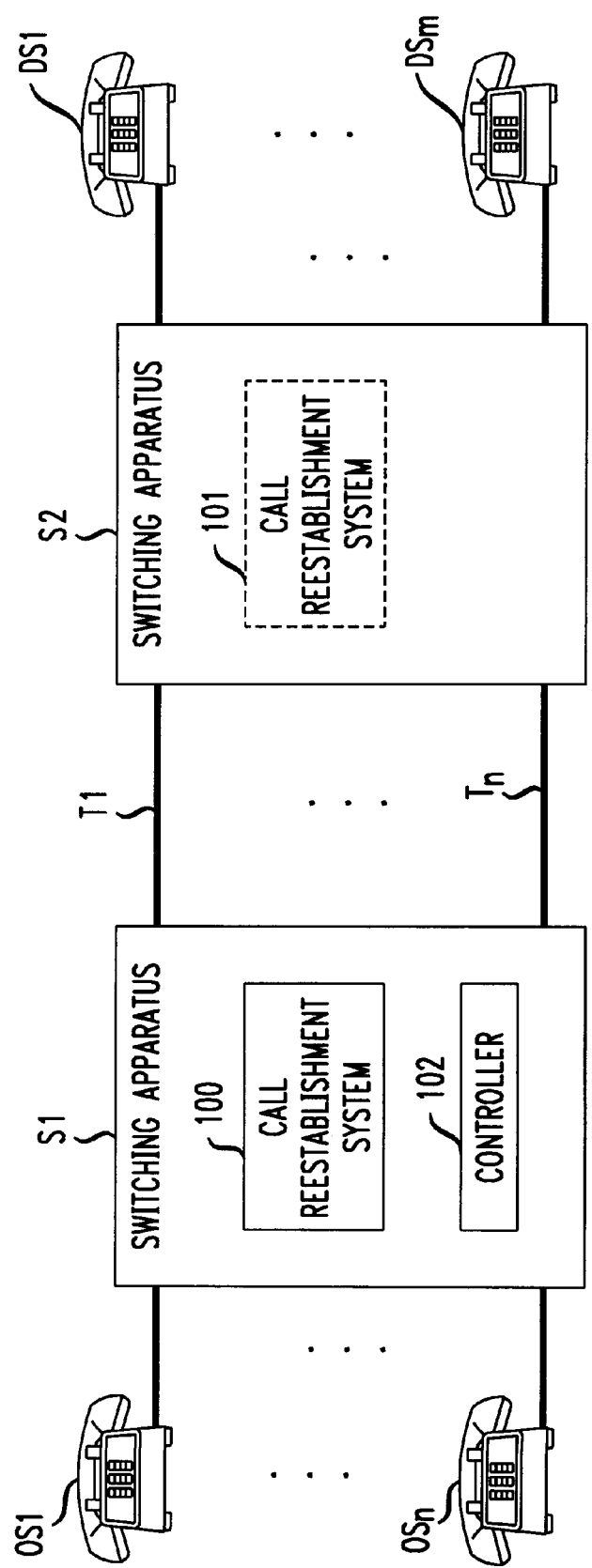
FIG. 1 illustrates in block diagram form the architecture of a typical intranet communication network with the inclusion of the present call reestablishment system.

FIG. 1 illustrates in block diagram form the architecture of a typical intranet network that includes the present call reestablishment system 100. In particular, a typical intranet network comprises a plurality of switching apparatus S1, S2 that are interconnected by communication facilities T1–Tn that consist of voice and data trunks, ISIDN facilities, or time multiplexed carrier facilities that serve to enable each switching apparatus to establish communication connections from a calling party served by the originating switching apparatus to a called party served by the destination switching apparatus. Each switching apparatus S1, S2 typically serves a large number of subscribers, each of whom is equipped with a station set OS1–OSn, DS1–DSn that provides the subscriber with voice and/or data and/or video communication capabilities in a well-known manner. The operation of this intranet network is well-known and is not described in further detail herein except where it is pertinent for an understanding of the operation of the present call reestablishment system 100.

The present call reestablishment system 100 is implemented in this intranet network as an integral element within the switching apparatus S1 that serves each node of the intranet network. Thus, in the block diagram illustration of FIG. 1, the present call reestablishment system 100 is illustrated as a functional element of each of the switching apparatus nodes S1, S2 of the intranet network. Alternatively, the present call reestablishment system 100 can be a centralized element that functions within the bounds of the intranet network to communicate with each of the switching apparatus to provide the services described herein. The present call reestablishment system 100 in this configuration receives control signals from each of the switching apparatus S1, S2 and, in response thereto, implements the desired call reestablishment function and effects the implementation of the requested function by transmitting control signals back to the various switching apparatus to thereby control the interconnection of the various communication facilities that are used to implement the particular communication connection.

Call Reestablishment: Out-of-Band Signaling

Figure 2:
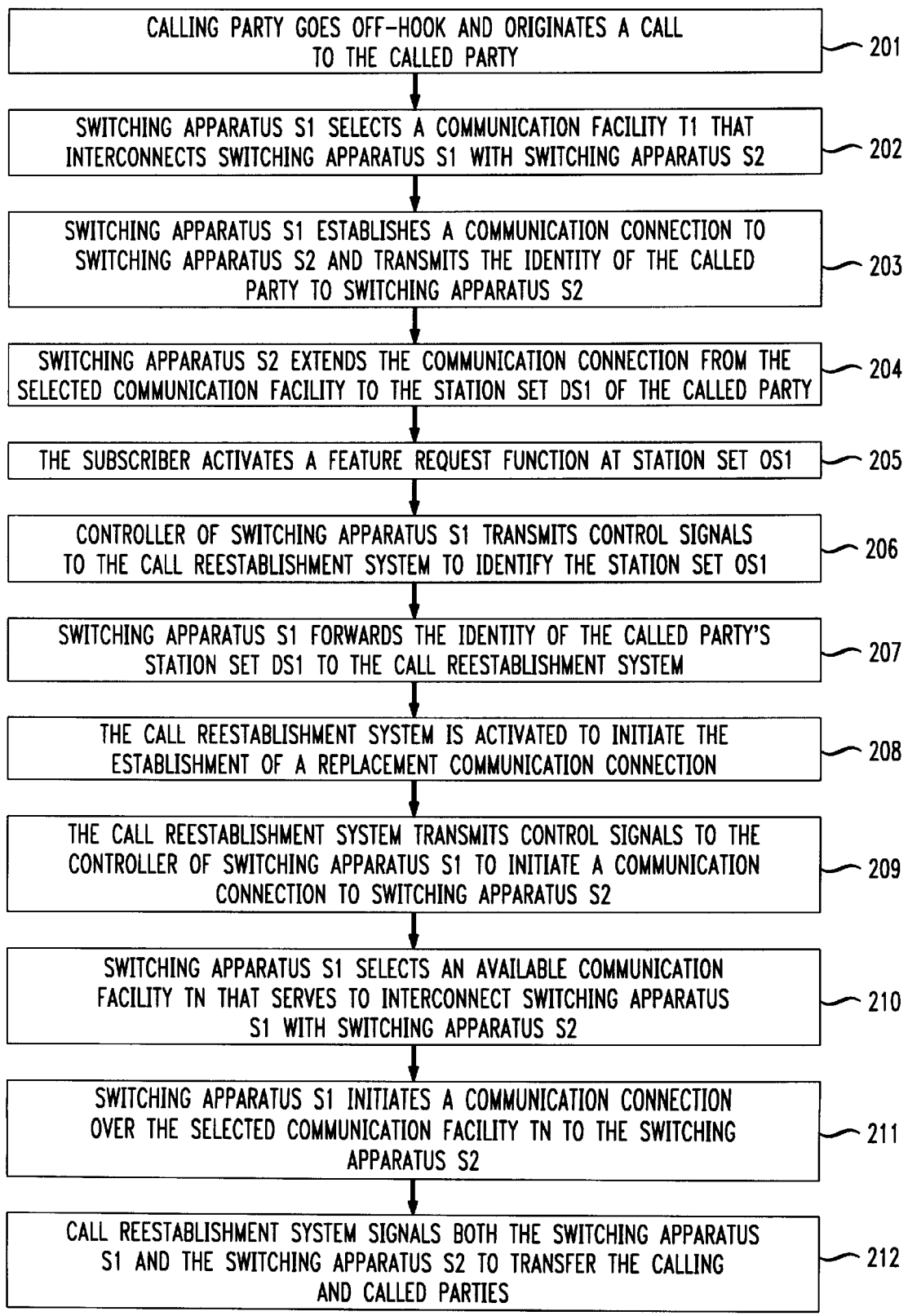
FIG. 2 illustrates in flow diagram form the operational steps taken by the present call reestablishment system to effect the substitution of a new communication connection for an existing communication connection using out-of-band signaling.

FIG. 2 illustrates in flow diagram form the operation of the present call reestablishment system 100 to transfer a calling and called party from an existing communication connection within the intranet network of FIG. 1 to an alternative communication connection of identical nature within the intranet network of FIG. 1 using out-of-band signaling. In this example, both of the switching apparatus S1 and S2 are systems, such as a private branch exchange systems, that serve telephone station sets OS1–OSn, DS1–DSm that are equipped to communicate with the controller 102 of the associated switching apparatus S1 and S2 via out-of-band signaling. This entails providing a control signaling path that interconnects each telephone station set OS1–OSn with the controller 102 exclusive of the communication path that is established between the calling and called parties to carry communications therebetween. This is a common architecture used to provide a rich set of communication features to the station sets OS1–OSn, DS1–DSm served by the switching apparatus S1 and S2. The activation of the call reestablishment feature can be effected by either the calling party or the called party. It is assumed in the following example that the calling party initiates this request.

In operation, a calling party at station set OS1 that is served by switching apparatus S1 goes off-hook at step 201 and originates a call to the called party at station set DS1 that is served by the switching apparatus S2. Switching apparatus S1 and S2 are interconnected by a plurality of communication facilities T1–Tn, each of which comprises a communication trunk that, for the purpose of this description, are standard voice grade trunk facilities. In well-known fashion, the switching apparatus S1 responds to the call origination and control signals generated by the calling party at station set OS1 at step 202 by selecting a communication facility T1 that interconnects switching apparatus S1 with switching apparatus S2. At step 203, switching apparatus S1 establishes a communication connection to switching apparatus S2 and transmits the identity of the called party to switching apparatus S2. In response to the receipt of the identity of the called party over a communication connection, switching apparatus S2 at step 204 extends the communication connection from the selected communication facility T1 to the station set DS1 of the called party.

For the purpose of this description, assume that the communication facility T1 that serves to interconnect switching apparatus S1 with switching apparatus S2 is of inadequate quality to satisfy the communication needs of the calling and called parties. In this instance, the calling party requests access to the call reestablishment system 100 by activating a feature request function at station set OS1 at step 205. The activation of a feature in a communication system can be implemented in a number of ways. The station set OS1 can be equipped with feature buttons that enable the user to select a particular preprogrammed feature and thereby signal the switching apparatus S1 that the calling party requests access to this feature. This is accomplished by the station set OS1 transmitting control signals that correspond to the feature defined by the selected feature button over a control path to the switching controller 102 of switching apparatus S1 to thereby signal switching apparatus S1 that the calling party has requested access to a particular predefined feature, in this case access to the call reestablishment system 100. In response to receipt of the control signals from station set OS1, the controller 102 of switching apparatus S1 at step 206 transmits control signals to the call reestablishment system 100 to identify the station set OS1 associated with the calling party that has requested access to the call reestablishment system 100.

In the present example, the calling party wishes to substitute other equivalent communication facilities for those serving the present communication connection, as indicated by the specific feature button activation. The switching apparatus S1 has stored in its memory the identity of the called party's station set DS1 and can forward this stored information at step 207 to the call reestablishment system 100 as part of the initial request generated by the calling party. The call reestablishment system 100, in response to the request and the data identifying the calling and called parties, is activated at step 208 to initiate the establishment of a replacement communication connection that can be used to serve the calling and called parties. This is accomplished at step 209 by the call reestablishment system 100 transmitting control signals to the controller 102 of switching apparatus S1 to initiate a communication connection to switching apparatus S2 that serves the called party. The switching apparatus S1 at step 210, in response to these control signals, selects an available communication facility Tn that serves to interconnect switching apparatus S1 with switching apparatus S2. Upon selection of this communication facility Tn, switching apparatus S1 initiates at step 211 a communication connection over the selected communication facility Tn to the switching apparatus S2 in well-known fashion. As part of this communication connection, switching apparatus S1 can transmit out of band signaling to switching apparatus S2 indicative of the nature of this communication connection as being a replacement communication connection for an existing communication connection. Alternatively, the call reestablishment system 100 can transmit control signals directly to switching apparatus S2 to alert this apparatus that an incoming call from switching apparatus S1 represents a substitute communication connection for an existing communication connection to the called party. In either case, the communication facility Tn is reserved as the communication facility between the switching apparatus S1 and switching apparatus S2 and identified as being available to serve the calling and called parties. The call reestablishment system 100 upon the availability of this communication connection, signals both the switching apparatus S1 and the switching apparatus S2 at step 212 to transfer the calling and called parties, respectively, from the existing communication connection on communication facility T1 to the newly established communication connection on communication facility Tn that has been reserved for their use. The transfer of the calling party from the existing communication connection to the newly established communication connection is synchronized with the analogous operation in the switching apparatus S2 to ensure that there is no loss of communication between the calling and called parties. The prior communication connection is abandoned by the release of the communication facilities T1 that comprised this communication connection. In this manner, the substitution of the alternate communication facilities is transparent to the calling and called parties and they are unaware of the completion of this operation other than the improvement in the quality of the communications available on the communication facilities serving this call.

An alternative application of this process is to change the common carrier that serves the original communication connection. This option is available to the subscriber who initiates the call reestablishment process by activating a feature button on their telephone station set that indicates to the call reestablishment system that other than a direct equivalent substitution of communication facilities is requested. For example, the subscriber may wish to convert the billing entity in an overseas call from a foreign common carrier to a domestic common carrier to thereby reduce the cost of the call, as noted above. Alternatively, the subscriber may wish to substitute multi-media communication facilities for the existing communication facilities. In either case, the out-of-band signaling can be used to enable the subscriber to input additional data via the keypad, feature buttons, or a combination of both to designate the facilities that are desired for this communication connection.

Call Reestablishment: In-Band Signaling

Figure 3:
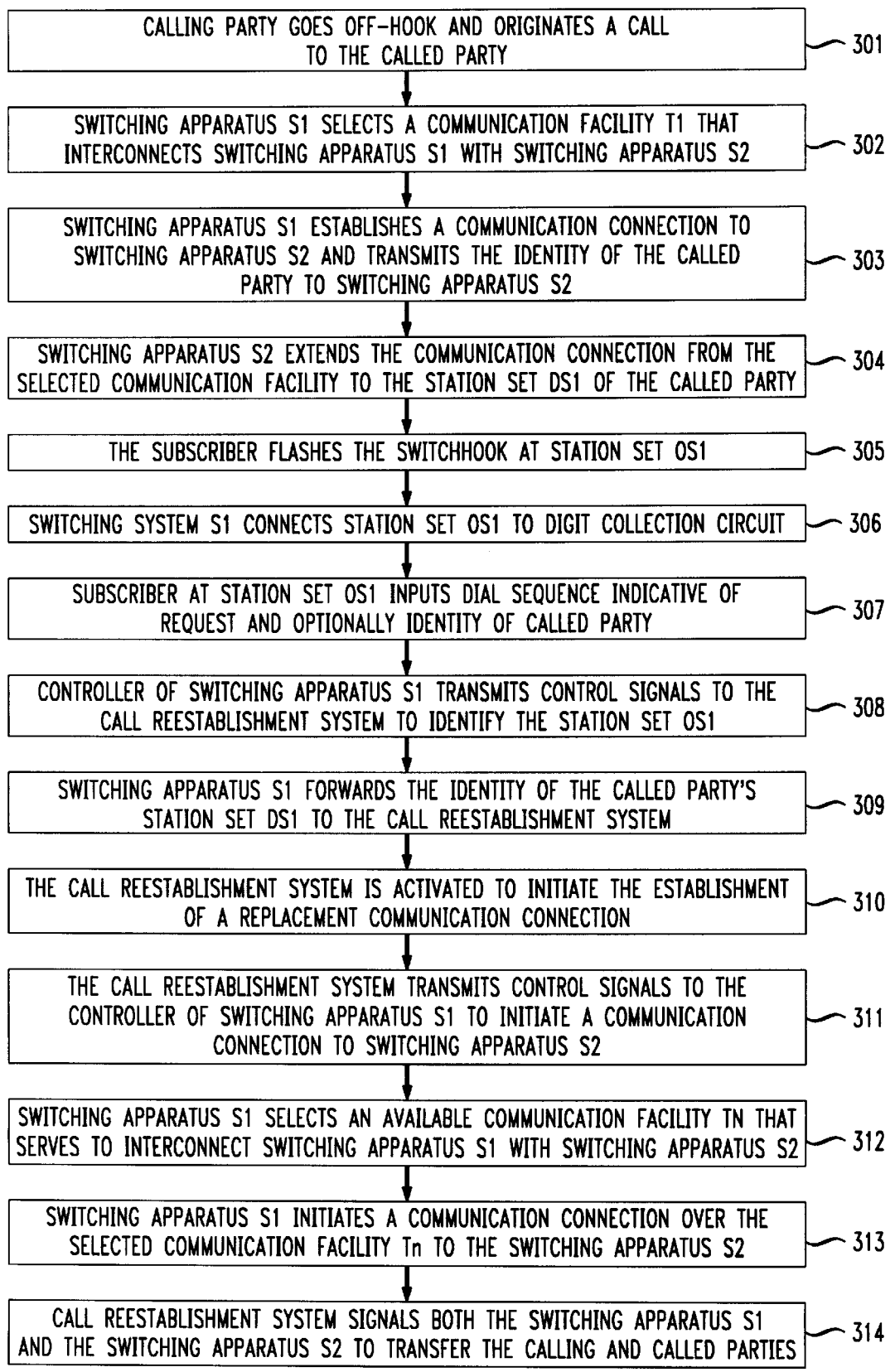
FIG. 3 illustrates in flow diagram form a variation of the operation of the present call reestablishment system where the communication facilities are transferred in a manner to effect the substitution of a new communication connection for an existing communication connection using in-band signaling.

FIG. 3 illustrates in flow diagram form the operation of the present call reestablishment system 100 to transfer a calling and called party from an existing communication connection within the intranet network of FIG. 1 to an alternative communication connection of identical nature within the intranet network of FIG. 1 using in-band signaling. In this example, both of the switching apparatus S1 and S2 are systems, such as common carrier central office systems, that serve telephone station sets that are not equipped to communicate with the controller of the associated switching apparatus S1 and S2 via out-of-band signaling. Thus, communications between each telephone station set and the controller of the associated switching apparatus S1 and S2 must occur over a communication path that is substituted for the communication path that is established between the calling and called parties to carry communications therebetween. This is a common architecture used to provide a limited communication features to the station sets served by the switching apparatus S1 and S2.

In operation, a calling party at station set OS1 that is served by switching apparatus S1 goes off-hook at step 301 and originates a call to the called party at station set DS1 that is served by the switching apparatus S2. Switching apparatus S1 and S2 are interconnected by a plurality of communication facilities T1–Tn each of which comprises a communication trunk that, for the purpose of this description, are standard voice grade trunk facilities. In well-known fashion, the switching apparatus S1 responds to the call origination and control signals generated by the calling party at station set OS1 at step 302 by selecting a communication facility T1 that interconnects switching apparatus S1 with switching apparatus S2. At step 303, switching apparatus S1 establishes a communication connection to switching apparatus S2 and transmits the identity of the called party to switching apparatus S2. In response to the receipt of the identity of the called party over a communication connection, switching apparatus S2 at step 304 extends the communication connection from the selected communication facility to the station set DS1 of the called party.

For the purpose of this description, assume that the communication facility T1 that serves to interconnect switching apparatus S1 with switching apparatus S2 is of inadequate quality to satisfy the communication needs of the calling and called parties. In this instance, the calling party requests access to the call reestablishment system 100 by initiating a feature request at station set OS1 at step 305. The activation of a feature in a communication system S1 can be accomplished by the user at station set OS1 flashing the switchhook of the station set OS1 to obtain dial tone. This operation interrupts the original communication connection and switching system S1 connects station set OS1 to a digit collection register that is part of controller 102 at step 306. This enables the user to transmit a request at step 307 in the form of in-band dialing signals that correspond to the desired feature to the switching controller 100 of switching apparatus S1 to thereby signal switching apparatus S1 that the calling party has requested access to a particular predefined feature, in this case access to the call reestablishment system 100. In response to receipt of the in-band dialing signals from station set OS1, the controller of switching apparatus S1 at step 308 transmits control signals to the call reestablishment system 100 to identify the station set OS1 associated with the calling party that has requested access to the call reestablishment system 100.

In the present example, the calling party wishes to substitute other equivalent communication facilities for those serving the present communication connection. The switching apparatus S1 has stored in its memory the identity of the called party's station set DS1 (or receives this information as part of the in-band dialing signals) and can forward this stored information at step 309 to the call reestablishment system 100 as part of the initial request generated by the calling party. The call reestablishment system 100, in response to the request and the data identifying the calling and called parties, is activated at step 310 to initiate the establishment of a replacement communication connection that can be used to serve the calling and called parties. This is accomplished at step 311 by the call reestablishment system 100 transmitting control signals to the controller of switching apparatus S1 to initiate a communication connection to switching apparatus S2 that serves the called party. The switching apparatus S1 at step 312, in response to these control signals, selects an available communication facility Tn that serves to interconnect switching apparatus S1 with switching apparatus S2. Upon selection of this communication facility Tn, switching apparatus S1 initiates at step 313 a communication connection over the selected communication facility Tn to the switching apparatus S2 in well-known fashion. As part of this communication connection, switching apparatus S1 can transmit out of band signaling to switching apparatus S2 indicative of the nature of this communication connection as being a replacement communication connection for an existing communication connection. Alternatively, the call reestablishment system 100 can transmit control signals directly to switching apparatus S2 to alert this apparatus that an incoming call from switching apparatus S1 represents a substitute communication connection for an existing communication connection to the called party. In either case, the communication facility Tn is reserved as the communication facility between the switching apparatus S1 and switching apparatus S2 and identified as being available to serve the calling and called parties. The call reestablishment system 100 upon the availability of this communication connection, signals both the switching apparatus S1 and the switching apparatus S2 at step 314 to transfer the calling and called parties, respectively, from the existing communication connection on communication facility T1 to the newly established communication connection on communication facility Tn that has been reserved for their use. The transfer of the calling party from the existing communication connection to the newly established communication connection is synchronized with the analogous operation in the switching apparatus S2 to ensure that there is no loss of communication between the calling and called parties. The prior communication connection is abandoned by the release of the communication facilities that comprised this communication connection. In this manner, the substitution of the alternate communication facilities is transparent to the calling and called parties and they are unaware of the completion of this operation other than the improvement in the quality of the communications available on the communication facilities serving this call.

An alternative application of this process is to change the common carrier that serves the original communication connection. This option is available to the subscriber who initiates the call reestablishment process by initiating a feature request by flashing the switchhook and entering digits on their telephone station set that indicates to the call reestablishment system that other than a direct equivalent substitution of communication facilities is requested. For example, the subscriber may wish to convert the billing entity in an overseas call from a foreign common carrier to a domestic common carrier to thereby reduce the cost of the call, as noted above. Alternatively, the subscriber may wish to substitute multimedia communication facilities for the existing communication facilities. In either case, the in-band signaling can be used to enable the subscriber to input additional data via the keypad to designate the facilities that are desired for this communication connection.

Communication Connection Switching via Call Waiting

There are instances where the switching apparatus S2 that serves the called party is not specifically equipped with the ability to perform the call reestablishment function as described above. An example can be where the called party is served by a standard residential central office switching system that does not have the capability to provide enhanced call reestablishment features. In this instance, if the called party is served by a call-waiting function, the call reestablishment system can utilize that capability to perform the call reestablishment function. In particular, the operation of the call reestablishment is as described above wherein the calling party initiates the activation of the feature and a replacement communication connection is established from the switching apparatus S1 that serves the calling party to the switching apparatus S2 that serves the called party. Upon receipt of the newly originated substitute call, the switching apparatus S2 signals the called party by means of the standard call waiting alert and the called party can transfer the communications to this new communication facility.

SUMMARY

The call reestablishment system enables a requesting party to input data indicative of the nature of the call reestablishment that is required. The request can be processed either via in-band signaling or out-of-band signaling, as required by the capabilities of the serving communication switching system. The call reestablishment system is responsive to this data for creating a replacement communication connection for the existing communication connection and, once the facilities are in place to enable the calling and called parties to communicate, the call reestablishment system automatically transfers the calling and called parties from the original communication connection to this newly established communication connection in a manner that is transparent to the parties and without loss of any communications. This feature can be used to replace a poor quality communication connection, change common carriers, change the mode of communications, and establish multimedia communication connections.

What is claimed:

1. A call reestablishment system for automatically replacing an existing communication connection comprising communication facilities that interconnect a telephone station set of a calling party with a telephone station set of a called party with a replacement communication facilities to interconnect said telephone station set of said calling party with said telephone station set of said called party, comprising:

means for receiving control signals from said telephone station set of a call reestablishment initiating one of said calling and called parties;

means, responsive to said control signals, for selecting replacement communication facilities to interconnect said telephone station set of said calling party with said telephone station set of said called party; and means for automatically and simultaneously switching, without interruption of communication between said calling and called parties, both said telephone station set of said calling party and said telephone station set of said called party from said existing communication connection comprising communication facilities that interconnect said telephone station set of said calling party with said telephone station set of said called party to said replacement communication facilities.

2. The call reestablishment system of claim 1, when implemented in a telephone switching system that serves to interconnect a plurality of station sets with a lesser plurality of communication facilities, said means for receiving comprises:

control signal receiving means for receiving feature control signals generated by said station set used by said call reestablishment initiating one of said calling and called parties exclusive of said communication connection.

3. The call reestablishment system of claim 2 wherein said means for receiving further comprises:

means for translating said control signals into a request for said replacement communication facilities to interconnect said telephone station set of said calling party with said telephone station set of said called party; and means for generating data indicative of an identity of said calling and said called parties.

4. The call reestablishment system of claim 3 wherein said means for receiving further comprises:

means for identifying a type of communication facility used in said existing communication connection.

5. The call reestablishment system of claim 4 wherein said means for selecting comprises:

means, responsive to said generated data and said identified type of communication facility, for locating at least one communication facility that is substantially equivalent to said identified type of communication facility; and means for reserving one of said at least one communication facility.

6. The call reestablishment system of claim 1 wherein said means for automatically and simultaneously switching comprises:

means, located at a first end of said selected replacement communication facilities, capable of transferring said telephone station set of said calling party from said existing communication connection comprising communication facilities that interconnect a telephone station set of said calling party with a telephone station set of said called party to said selected replacement communication facilities;

means, located at a second end of said selected replacement communication facilities, capable of transferring said telephone station set of said called party from said existing communication connection comprising communication facilities that interconnect a telephone station set of said calling party with a telephone station set of said called party to said selected replacement communication facilities; and means for simultaneously activating both said means capable of transferring said telephone station set of said calling party and said means capable of transferring said telephone station set of said called party to switch both said telephone station set of said calling and said telephone station set of said called parties from said existing communication connection comprising communication facilities that interconnect said telephone station set of said calling party with said telephone station set of said called party to said replacement communication facilities.

7. The call reestablishment system of claim 1, when implemented in a telephone switching system that serves to interconnect a plurality of station sets with a lesser plurality of communication facilities, said means for receiving comprises:

means, responsive to control signals generated by said station set used by said call reestablishment initiating one of said calling and called parties, for interrupting said communication connection; and control signal receiving means for receiving feature control signals generated by said station set used by said call reestablishment initiating one of said calling and called parties.

8. The call reestablishment system of claim 7 wherein said means for receiving further comprises:

means for translating said control signals into a request for said replacement communication facilities to interconnect said telephone station set of said calling party with said telephone station set of said called party; and means for generating data indicative of an identity of said calling and said called parties.

9. The call reestablishment system of claim 8 wherein said means for receiving further comprises:

means for identifying a type of communication facility used in said existing communication connection.

10. The call reestablishment system of claim 9 wherein said means for selecting comprises:

means, responsive to said generated data and said identified type of communication facility, for locating at least one communication facility that is substantially equivalent to said identified type of communication facility; and means for reserving one of said at least one communication facility.

11. A method of automatically replacing an existing communication connection comprising communication facilities that interconnect a telephone station set of a calling party with a telephone station set of a called party with a replacement communication facilities to interconnect said telephone station set of said calling party with said telephone station set of said called party, comprising the steps of:

receiving control signals from a call reestablishment initiating one of said telephone station sets of said calling and called parties;

selecting, in response to said control signals, replacement communication facilities to interconnect said telephone station set of said calling party with said telephone station set of said called party; and automatically and simultaneously switching, without interruption of communication between said calling and called parties, both said telephone station set of said calling and said telephone station set of said called parties from said existing communication connection comprising communication facilities that interconnect said telephone station set of said calling party with said telephone station set of said called party to said replacement communication facilities.

12. The method of claim 11, when implemented in a telephone switching system that serves to interconnect a plurality of station sets with a lesser plurality of communication facilities, said step of receiving comprises:

receiving feature control signals generated by said station set used by said call reestablishment initiating one of said calling and called parties exclusive of said communication connection.

13. The method of claim 12 wherein said step of receiving further comprises:

translating said control signals into a request for said replacement communication facilities to interconnect said telephone station set of said calling party with said telephone station set of said called party; and generating data indicative of an identity of said calling and said called parties.

14. The method of claim 13 wherein said step of receiving further comprises:

identifying a type of communication facility used in said existing communication connection.

15. The method of claim 14 wherein said step of selecting comprises:

locating, in response to said generated data and said identified type of communication facility, at least one communication facility that is substantially equivalent to said identified type of communication facility; and reserving one of said at least one communication facility.

16. The method of claim 11 wherein said step of automatically and simultaneously switching comprises:

selecting apparatus, located at a first end of said selected replacement communication facilities, capable of transferring said telephone station set of said calling party from said existing communication connection comprising communication facilities that interconnect a telephone station set of said calling party with a telephone station set of said called party to said selected replacement communication facilities;

selecting apparatus, located at a second end of said selected replacement communication facilities, capable of transferring said telephone station set of said called party from said existing communication connection comprising communication facilities that interconnect a telephone station set of said calling party with a telephone station set of said called party to said selected replacement communication facilities; and simultaneously activating both said selected apparatus capable of transferring said telephone station set of said calling party and said selected apparatus capable of transferring said telephone station set of said called party to switch both said telephone station set of said calling and said telephone station set of said called parties from said existing communication connection comprising communication facilities that interconnect said telephone station set of said calling party with said telephone station set of said called party to said replacement communication facilities.

17. The method of claim 11, when implemented in a telephone switching system that serves to interconnect a plurality of station sets with a lesser plurality of communication facilities, said step for receiving comprises:

interrupting, in response to control signals generated by said station set used by said call reestablishment initiating one of said calling and called parties, said communication connection; and receiving feature control signals generated by said station set used by said call reestablishment initiating-one of said calling and called parties.

18. The method of claim 17 wherein said step of receiving further comprises:

translating said control signals into a request for said replacement communication facilities to interconnect said telephone station set of said calling party with said telephone station set of said called party; and generating data indicative of an identity of said calling and said called parties.

19. The method of claim 18 wherein said step of receiving further comprises:

identifying a type of communication facility used in said existing communication connection.

20. The method of claim 19 wherein said step of selecting comprises:

locating, in response to said generated data and said identified type of communication facility, at least one communication facility that is substantially equivalent to said identified type of communication facility; and reserving one of said at least one communication facility.

21. A call reestablishment system, operable in at least of one of a first telecommunications switching system that serves a telephone station set of a calling party and a second telecommunications switching system that serves a telephone station set of a called party, which said first and second telecommunications switching systems are interconnected by a plurality of communication facilities, for automatically replacing an existing communication connection comprising a one of said communication facilities that interconnect said telephone station set of said calling party with said telephone station set of said called party with a replacement one of said communication facilities to interconnect said telephone station set of said calling party with said telephone station set of said called party, comprising:

means for receiving control signals from a telephone station set of a call reestablishment initiating one of said calling and called parties;

means, responsive to said control signals, for selecting said replacement one of said communication facilities to interconnect said telephone station set of said calling party with said telephone station set of said called party;

means for activating both said first and second telecommunications switching systems to simultaneously switch both said telephone station set of said calling and said telephone station set of said called parties from said existing communication connection to said replacement communication facilities.

22. The call reestablishment system of claim 21, wherein said first and second telecommunications switching systems serve to interconnect a plurality of telephone station sets with a lesser plurality of communication facilities, said means for receiving comprises:

control signal receiving means for receiving feature control signals generated by a one of said plurality of telephone station sets used by said call reestablishment initiating one of said calling and called parties exclusive of said communication connection.

23. The call reestablishment system of claim 22 wherein said means for receiving further comprises:

means for translating said control signals into a request for said replacement communication facilities to interconnect said telephone station set of said calling party with said telephone station set of said called party; and means for generating data indicative of an identity of said telephone station set of said calling and said called parties.

24. The call reestablishment system of claim 23 wherein said means for receiving further comprises:

means for identifying a type of communication facility used in said existing communication connection.

25. The call reestablishment system of claim 24 wherein said means for selecting comprises:

means, responsive to said generated data and said identified type of communication facility, for locating at least one communication facility that is substantially equivalent to said identified type of communication facility; and means for reserving one of said at least one communication facility.

26. The call reestablishment system of claim 21 wherein said means for simultaneously switching comprises:

means, located at a first end of said selected replacement communication facilities, capable of transferring said telephone station set of said calling party from said existing communication connection to said selected replacement communication facilities;

means, located at a second end of said selected replacement communication facilities, capable of transferring said telephone station set of said called party from said existing communication connection to said selected replacement communication facilities; and means for simultaneously activating both said means capable of transferring said telephone station set of said calling party and said means capable of transferring said telephone station set of said called party to switch both said telephone station set of said calling and said telephone station set of said called parties from said existing communication connection to said replacement communication facilities.

27. The call reestablishment system of claim 21, wherein said first and second telecommunications switching systems serve to interconnect a plurality of telephone station sets with a lesser plurality of communication facilities, said means for receiving comprises:

means, responsive to control signals generated by a one of said plurality of telephone station sets used by said call reestablishment initiating one of said calling and called parties, for interrupting said communication connection; and control signal receiving means for receiving feature control signals generated by said one of said plurality of telephone station sets used by said call reestablishment initiating one of said calling and called parties.

28. The call reestablishment system of claim 27 wherein said means for receiving further comprises:

means for translating said control signals into a request for said replacement communication facilities to interconnect said telephone station set of said calling party with said telephone station set of said called party; and means for generating data indicative of an identity of said telephone station set of said calling and said called parties.

29. The call reestablishment system of claim 28 wherein said means for receiving further comprises:

means for identifying a type of communication facility used in said existing communication connection.

30. The call reestablishment system of claim 29 wherein said means for selecting comprises:

means, responsive to said generated data and said identified type of communication facility, for locating at least one communication facility that is substantially equivalent to said identified type of communication facility; and means for reserving one of said at least one communication facility.

* * * * *